United States Patent
Said

(10) Patent No.: US 7,190,840 B2
(45) Date of Patent: Mar. 13, 2007

(54) TRANSFORM COEFFICIENT COMPRESSION USING MULTIPLE SCANS

(75) Inventor: Amir Said, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 274 days.

(21) Appl. No.: 10/041,218

(22) Filed: Jan. 7, 2002

(65) Prior Publication Data

US 2003/0128886 A1 Jul. 10, 2003

(51) Int. Cl.
*G06K 9/36* (2006.01)
*G06K 9/46* (2006.01)

(52) U.S. Cl. ...................... 382/248; 382/250
(58) Field of Classification Search ............... 362/168, 362/233–263; 375/240–243; 348/384.1–440.1
See application file for complete search history.

(56) References Cited

U.S. PATENT DOCUMENTS

| | | | | |
|---|---|---|---|---|
| 5,278,646 A | * | 1/1994 | Civanlar et al. | 375/240.25 |
| 5,295,203 A | * | 3/1994 | Krause et al. | 382/248 |
| 5,321,776 A | * | 6/1994 | Shapiro | 382/240 |
| 5,369,437 A | * | 11/1994 | Koga et al. | 348/401.1 |
| 5,414,780 A | * | 5/1995 | Carnahan | 382/276 |
| 5,606,421 A | * | 2/1997 | Suzuki et al. | 386/33 |
| 5,757,973 A | * | 5/1998 | Wilkinson et al. | 382/246 |
| 6,055,017 A | * | 4/2000 | Shen et al. | 375/240.11 |
| 6,266,450 B1 | * | 7/2001 | Yip et al. | 382/240 |
| 6,870,963 B2 | * | 3/2005 | Govindaswamy et al. | 382/250 |

FOREIGN PATENT DOCUMENTS

JP 07-274168 * 10/1995

OTHER PUBLICATIONS

Apostolopoulos J: "Position-Dependent Encoding" Processing of the International Conference on Acoustics, Speech and Signal Processing (ICASSP). I Image and Multidimentsional Signal Processing Adelaide, Apr. 19-22, 1994 New York pp. vol. 5, conf. 19 V-573 to V-576.
Memon N: "Adaptive coding of DCT coefficients by Golomb-Rice Codes"Image Processing, 1998, ICIP 98 Proceedings. Proceedings. 1998 International Conference on Chicago, IL USA Oct. 4-7, 1998, Los Alamitos, CA USA IEEE Comput. Soc, US Oct. 4, 1998 pp. 516-520.
Grosse H-J et al: "Improved coding of transform coefficients in JPEG-like image compression schemes" Pattern Recognition Letters, Northe-Holland Publ. Amsterdam, NL vol. 21, No. 12 Nov. 2000 pp. 1061-1069.
Panchanathan S et al: "JPEG based scalable image compression" Computer Communications, Elsevier Science Publications BV, Amsterdam, IL vol. 19 No. 12 Oct. 1, 1996 pp. 1001-1013.

* cited by examiner

*Primary Examiner*—Jingge Wu
*Assistant Examiner*—Brian Le

(57) ABSTRACT

A transform coefficient block of a frequency domain representation of a digital image is processed by performing scans on at least three different regions of the block.

37 Claims, 4 Drawing Sheets

TRANSFORM COEFFICIENT COMPRESSION USING MULTIPLE SCANS

BACKGROUND

Data compression is used for reducing the cost of storing large data files on computers, as well as reducing the time for transmitting large data files between computers. In the so-called "transform methods" data is transformed into coefficients that represent the data in a frequency domain. Coefficients may be quantized (lossy compression) without significantly affecting the quality of data that is reconstructed from the quantized coefficients. Redundancy in the coefficients may then be reduced or eliminated without affecting quality of the reconstructed data (lossless compression).

One class of transforms is the discrete cosine transform. The DCT puts most of the image information in a small number of coefficients. The majority of the coefficients can be quantized to smaller bit sizes in order to gain compression.

The DCT is fast to calculate. However, performing lossless compression on the DCT coefficients can be expensive and complex.

SUMMARY

According to one aspect of the present invention, a transform coefficient block of a frequency domain representation of a digital image is processed by performing scans on at least three different regions of the block. Other aspects and advantages of the present invention will become apparent from the following detailed description, taken in conjunction with the accompanying drawings, illustrating by way of example the principles of the present invention.

DETAILED DESCRIPTION

Figure 1:
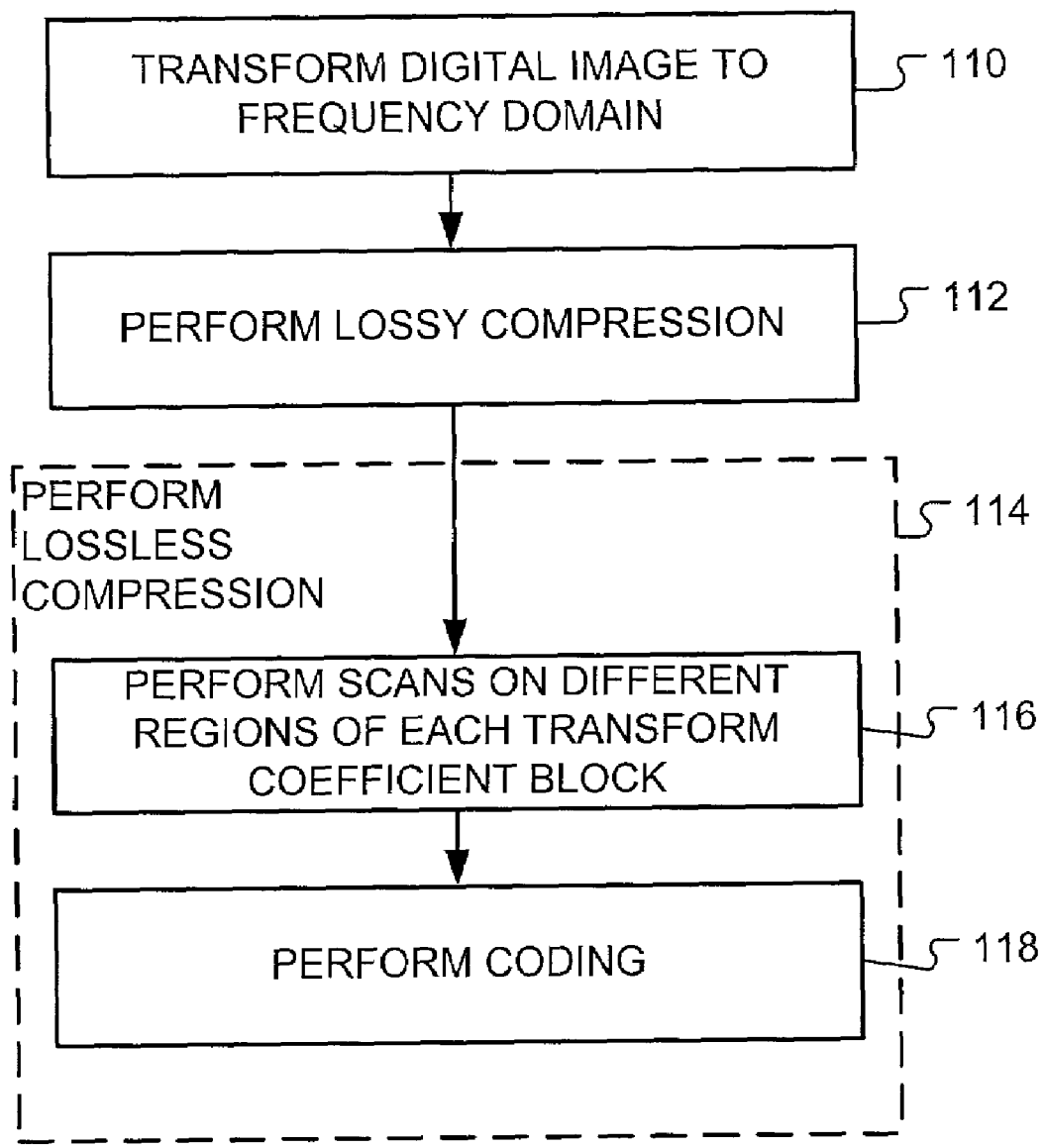
FIG. 1 is an illustration of a method of compressing a digital image.

As shown in the drawings for purposes of illustration, the present invention is embodied in a method for compressing digital images. The method is especially efficient for compressing digital images containing text and other shapes having horizontal and vertical edges. The method may be used by printers and other machines having separate pipelines for text and graphics.

The method will be described in connection with the discrete cosine transform. However, the method is not limited to DCT transforms. It may be used with Wavelets-based transforms and other transforms in which energy is concentrated (e.g., most of the energy in the low frequency components).

Reference is made to FIG. 1, which shows a method of compressing a digital image. The digital image includes an array of pixels. In the spatial domain, each pixel is represented by an n-bit word. In a typical 24-bit word representing RGB color space, for instance, eight bits represent a red component, eight bits represent a green component and eight bits represent a blue component.

The digital image is transformed from the spatial domain to a frequency domain (110). A discrete cosine transform may be used to transform blocks of pixels in the spatial domain to blocks of DCT coefficients in the frequency domain. For example, 8×8 blocks of pixels may be transformed to 8×8 blocks of DCT coefficients.

Lossy compression is performed on the blocks of transform coefficients (112). For example, the DCT coefficients may be quantized. Quantization rounds off the DCT coefficients to zero and non-zero values.

Figure 2:
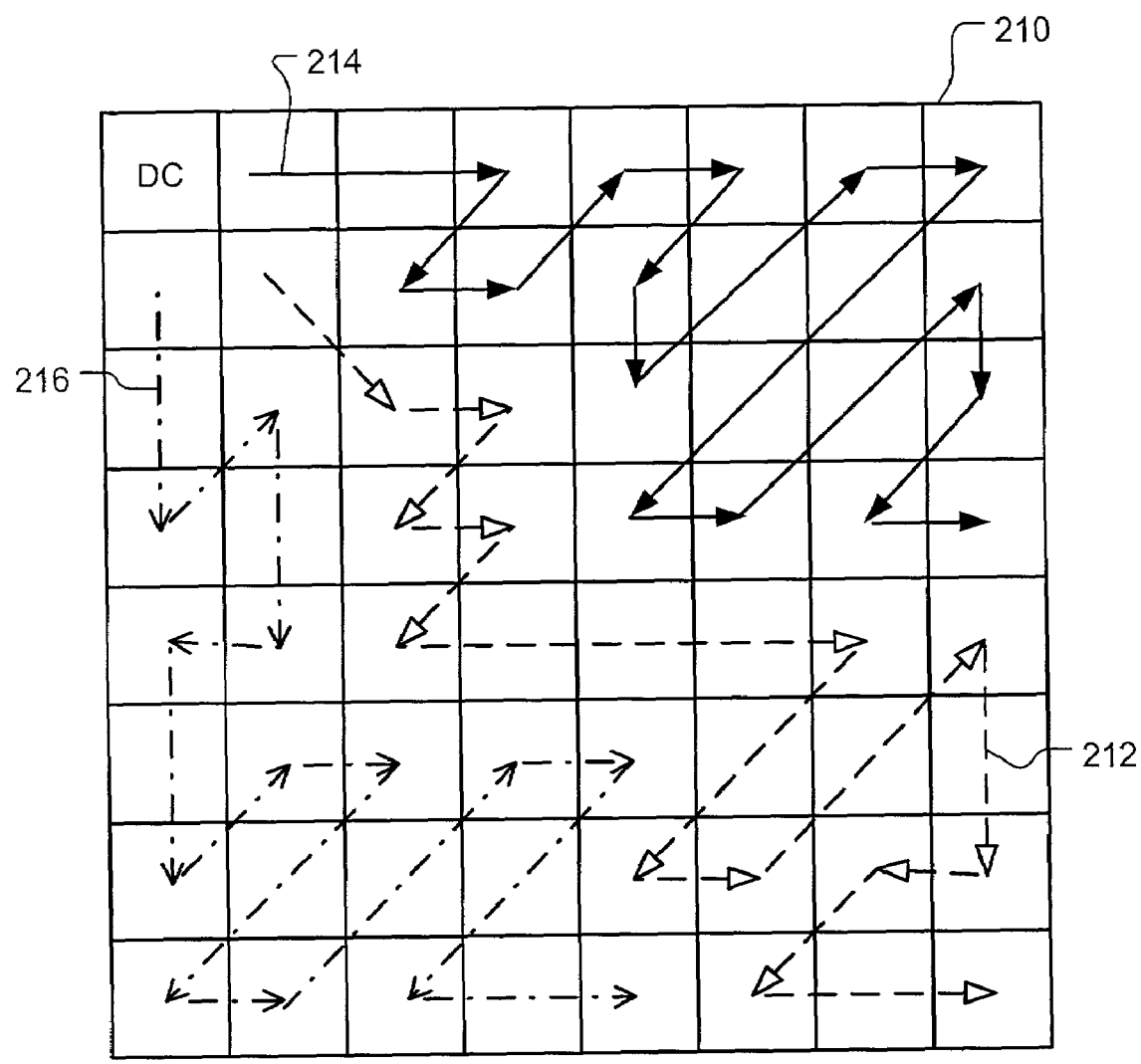
FIG. 2 is an illustration of a transform coefficient block of a frequency domain representation of the digital image.

Additional reference is now made to FIG. 2, which shows an 8×8 block 210 of DCT coefficients. The DC coefficient is in the upper left hand corner, and frequency increases towards the lower right hand corner. Typically, the quantized higher frequency coefficients will be equal to zero.

Lossless compression of the transform coefficients is then performed (114). Scans 212, 214 and 216 are performed on three different regions of each transform coefficient block (116). The first region includes, and the first scan 212 covers, those coefficients lying along a diagonal of the transform coefficient block 210. The second region includes, and the second scan 214 covers, those coefficients lying above the first region. The third region includes, and the third scan 216 covers, those coefficients lying below the first region. The second scan 214 (covering the coefficients in the second region) tends to cover horizontal edges, whereas the third scan 216 (covering the coefficients in the third region) tends to cover vertical edges.

Each scan may progress from the low frequency coefficients to the high frequency components. Typically the DC coefficient is not scanned because it is coded separately. Preferably, each scan 212, 214 and 216 covers the same number of coefficients. In the 8×8 block of transform coefficients shown in FIG. 2, each scan 212, 214 and 216 covers twenty one coefficients.

The coefficients are coded, one block at a time (118). Moreover, the scans of each block are coded separately. For example, the DC coefficient is coded and added to an output bitstream, the coefficients covered by the first scan 212 are coded and added to the bitstream, then the coefficients covered by the second scan 214 are coded and added to the bitstream, and then the coefficients covered by the third scan 216 are coded and added to the bitstream. The coding reduces the number of bits without reducing image information. The coding may be performed in any number of ways. As examples, the coefficients in each scan may be coded by conventional Huffman coding followed by run-length encoding, or they may be coded by entropy encoding or arithmetic coding.

Figure 3:
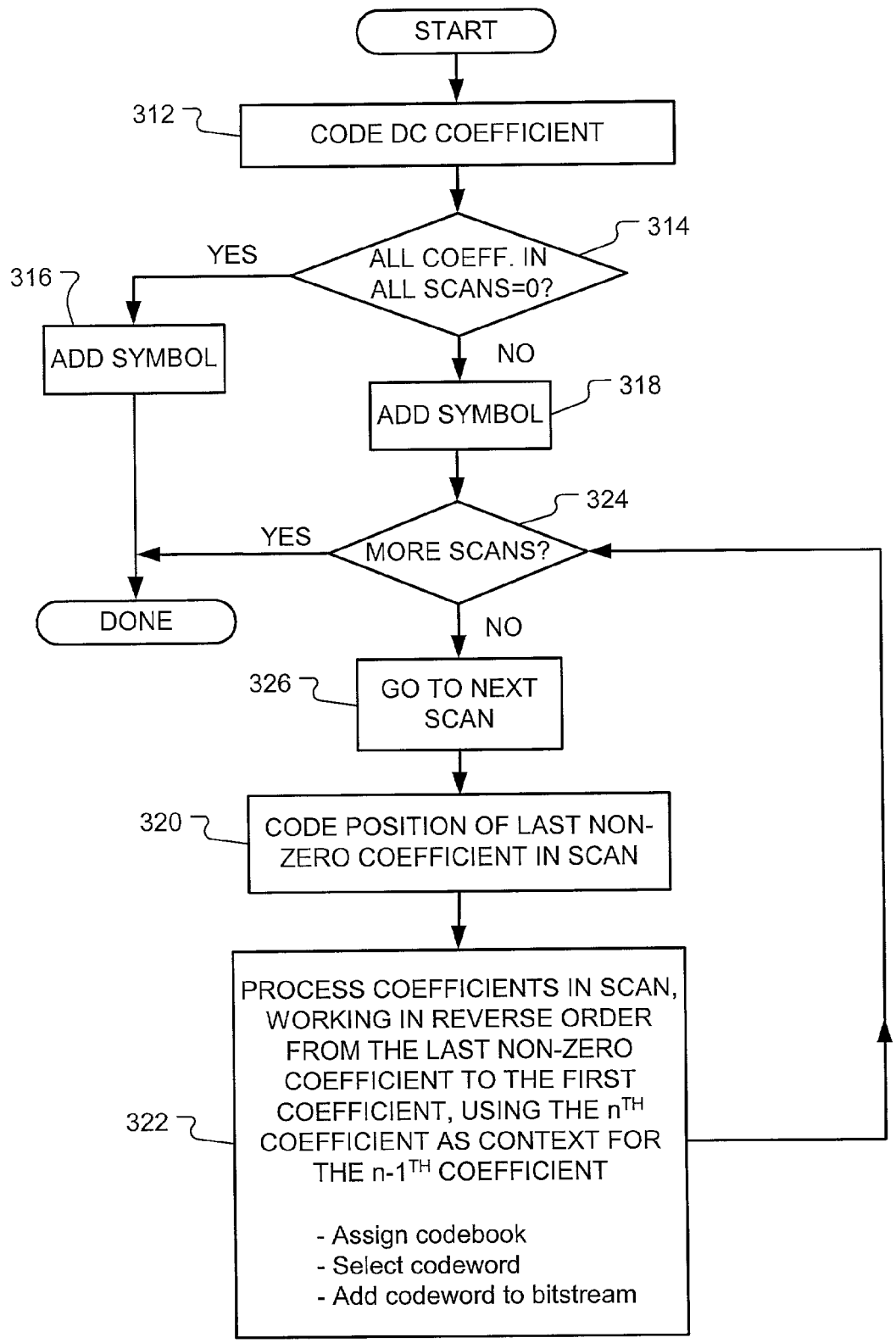
FIG. 3 is an illustration of a method of performing context-based coding on a block of the frequency domain representation.

Reference is now made to FIG. 3, which shows yet another coding method: context-based coding. The context-based coding is based on the assumption that the coefficients in a scan will typically have different distributions. The context-based coding assigns different codebooks to different distributions. For example, a first codebook is assigned to coefficients displaying a narrow distribution centered about zero, and a different codebook is assigned to coefficients displaying a wide distribution centered about zero. This approach tends to be more efficient than using the same codebook for the different distributions.

The context-based coding may be performed on each block as follows. The DC coefficient is coded and added to the bitstream (312). If all coefficients in all scans are equal to zero (314), a special symbol indicating such is added to the bitstream (316), and the coding is finished. If all coefficients in all scans are not equal to zero (314), a special symbol indicating such is added to the bitstream (318), and the first scan is examined (326).

The last non-zero coefficient in the scan is found, and its position is coded and added to the bitstream (320). Then, the coefficients in the scan are processed (322) in reverse order, from the last non-zero coefficient in the scan to the first. If a scan contains all zero coefficients, the position of the last non-zero coefficient may be coded as a zero, and no coefficients would be processed. Another scan is examined (326) until all scans have been coded (324).

The coefficients in a scan may be processed (322) by using the $n^{th}$ coefficient in the scan as context for the $n-1^{th}$ coefficient in the scan. The $n^{th}$ coefficient is used to select one of multiple codebooks for the $n-1^{th}$ coefficient, and the selected codebook is used to provide a codeword for the $n-1^{th}$ coefficient. Path length and magnitude of each coefficient may be coded. The codeword corresponding to the $n-1^{th}$ coefficient is added to the bitstream.

Consider the following example of coefficients in a scan: 153, −41, −8, −1, −1, 1, 0, 1, 0, 0, . . . 0, 0. Now consider the following rule for assigning codebooks: a codebook $c_0$ is assigned to a coefficient preceding a 0, a codebook $c_1$ to a coefficient preceding a ±1, a codebook $c_2$ to a coefficient preceding a ±2, a codebook $c_3$ to a coefficient preceding a ±3 or ±4, a codebook $c_4$ to a coefficient preceding a ±5 or ±6 or ±7 or ±8, and codebook $c_5$ to all other coefficients. The codebooks are assigned as shown below in Table 1. A codeword for 153 is taken from codebook $c_5$, a codeword for −41 is taken from codebook $c_4$, a codeword for −8 is taken from codebook $c_1$, and so on.

TABLE 1

| Coeff. No. | Value | Codebook Assignment |
| --- | --- | --- |
| 1 | 153 | Assign codebook $c_5$ |
| 2 | −41 | Assign codebook $c_4$ |
| 3 | −8 | Assign codebook $c_1$ |
| 4 | −1 | Assign codebook $c_1$ |
| 5 | −1 | Assign codebook $c_1$ |
| 6 | 1 | Assign codebook $c_0$ |
| 7 | 0 | Assign codebook $c_1$ |
| 8 | 1 | Start assigning here. Assign codebook $c_0$ |
| 9 | 0 | |
| 10 | 0 | |

The compression method was just described for a single color channel. For a color digital image having multiple color channels (e.g., RGB, YUV), the method is performed on each color channel. Resulting are nine scans per block, which are coded separately. Context from the luminance channel may be used to code the chrominance channels. If a luminance value is 0, it may be assumed that the chrominance component is also zero.

Figure 4:
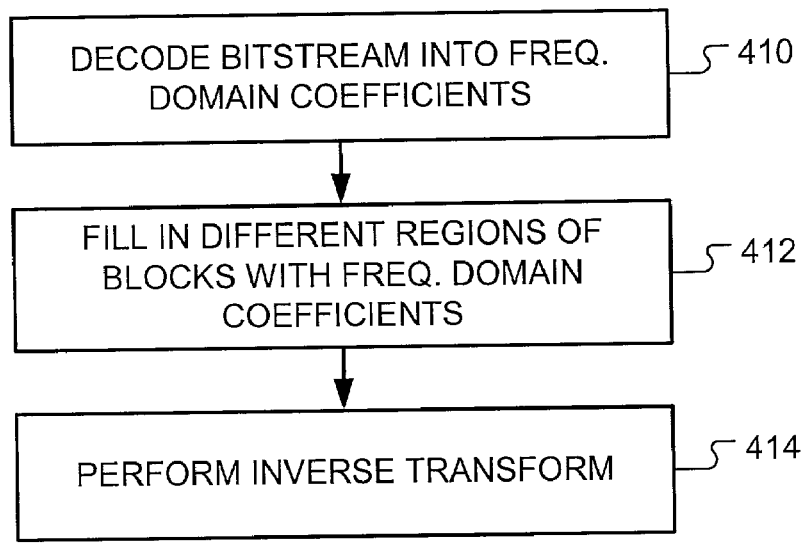
FIG. 4 is an illustration of a method of reconstructing a digital image from a bitstream.

Reference is now made to FIG. 4. A digital image is reconstructed by decoding a bitstream into frequency domain coefficients (410); filling in at least three different regions of each transform coefficient block with the decoded frequency domain components to produce a frequency domain representation (412); and performing an inverse transform on the frequency domain representation (414).

Figure 5:
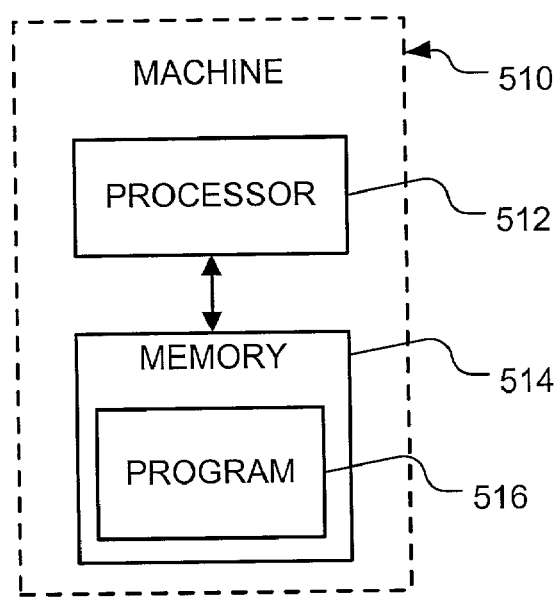
FIG. 5 is an illustration of apparatus for performing compression and reconstruction of a digital image.

Reference is now made to FIG. 5, which shows a machine 510 that performs one or both of the compression and reconstruction methods described above. The machine 510 includes a processor 512 and memory 514. The memory 514 stores a program 516 that, when executed, causes the processor 512 to compress or reconstruct the digital image as described above.

The compression method is not limited to the number of scan patterns and the shape of the scan patterns described above. Thus the compression method is not limited to three scan patterns having zig-zag shapes. The shapes of the scan patterns may be selected according to properties of the digital image.

Different scans may be non-overlapping, or they may overlap certain coefficients. Different scans may cover different numbers of transform coefficients, or they may cover the same number of coefficients.

More than three scans may be used. However, increasing the number of scans reduces the number of coefficients in each scan.

The method is not limited to 8×8 blocks of transform coefficients. Blocks of other sizes may be used.

The present invention is not limited to the specific embodiments described and illustrated above. Instead, the present invention is construed according to the claims that follow.

The invention claimed is:

1. A method of processing a transform coefficient block of a frequency domain representation of a digital image, the block including a plurality of transform coefficients, the method comprising performing separate scans on at least three different spatial regions of the transform coefficient block, wherein the separate scans include a first scan on a first spatial region, a second scan on a second spatial region, and a third scan on a third spatial region, the first spatial region being along an entire diagonal of the block, the second and third spatial regions being on opposite sides of the first region such that the first, second and third scans cover the entire block.

2. The method of claim 1, wherein the scans cover the same number of coefficients.

3. The method of claim 1, wherein the regions are selected according to properties of the image.

4. The method of claim 1, wherein the regions are optimized for edges in the image.

5. The method of claim 1, wherein the regions are non-overlapping.

6. The method of claim 1, wherein a zig-zag scan is performed in each region.

7. The method of claim 1, further comprising coding the coefficients covered by the scans, the scans being coded separately.

8. The method of claim 7, wherein for each scan, the last non-zero coefficient is found, and the coefficients are coded in reverse order from the last non-zero coefficient to the first coefficient in the scan.

9. The method of claim 8, wherein the coefficients are coded using the $n^{th}$ coefficient in the scan as context for the $n-1^{th}$ coefficient in the scan.

10. Apparatus for processing a frequency domain representation of a digital image, the apparatus comprising a processor for performing scans on at least three different spatial regions of a block of the frequency domain representation, the block including a plurality of transform coefficients, wherein the separtae scans include a first scan on a first spatial region, a second scan on a second spatial region, and a third scan on a third spatial region, the first spatial region being along an entire diagonal of the block, the second and third spatial regions being on opposite sides of the first region such that the first, second and third scans cover the entire block.

11. The apparatus of claim 10, wherein the scans cover the same number of coefficients.

12. The apparatus of claim 10, wherein the regions are selected according to properties of the image.

13. The apparatus of claim 10, wherein the regions are optimized for edges in the image.

14. The apparatus of claim 10, wherein the regions are non-overlapping.

15. The apparatus of claim 10, wherein a zig-zag scan is performed in each region.

16. The apparatus of claim 10, wherein the processor codes also codes the coefficients covered by the scans, the scans being coded separately.

17. The apparatus of claim 16, wherein for each scan, the last non-zero coefficient is found, and the coefficients are coded in reverse order from the last non-zero coefficient to the first coefficient.

18. The apparatus of claim 17, wherein the processor chooses from different codebooks to select codewords for the coefficients, a codebook for the $n^{th}$ coefficient being selected according to the $n-1^{th}$ coefficient in the scan.

19. Apparatus for processing a digital image, the apparatus comprising:
first means for generating a frequency domain representation of the digital image; and
second means for compressing blocks of the frequency domain representation, each block including a plurality of transform coefficients, the second means performing first, second and third scans on first, second and third spatial regions of each of the blocks of the frequency domain representation, the first spatial region being along an entire diagonal of the block, the second and third spatial regions being on opposite sides of the first region such that the first, second and third scans cover the entire block.

20. An article for a processor, the article comprising computer memory encoded with a program for instructing the processor to perform separate scans on at least three different spatial regions of a block of a transform domain representation of the image, the transform block including a plurality of transform coefficients, wherein the separate scans include a first scan on a first spatial region, a second scan on a second spatial region, and a third scan on a third spatial region, the first spatial region being along an entire diagonal of the block, the second and third spatial regions being on opposite sides of the first region such that the first, second and third scans cover the entire block.

21. The article of claim 20, wherein the scans cover the same number of coefficients in each block.

22. The article of claim 20, wherein the regions are selected according to properties of the image.

23. The article of claim 20, wherein the regions are optimized for edges in the image.

24. The article of claim 20, wherein the regions are non-overlapping.

25. The article of claim 20, wherein a zig-zag scan is performed in each region.

26. The article of claim 20, further comprising coding the coefficients covered by the scans, each scan being coded separately by finding the last non-zero coefficient, and coding the coefficients in reverse order, from the last non-zero coefficient to the first coefficient.

27. The article of claim 26, wherein the computer memory is further encoded with multiple codebooks, the program instructing the processor to select a codebook for a coefficient, select a codeword from the selected codebook, and add the selected codeword to a bitstream.

28. The article of claim 27, wherein the codebook for the $n-1^{th}$ coefficient in a scan is selected according to the $n^{th}$ coefficient in the scan.

29. A method of reconstructing a digital image from a bitstream, the method comprising:
decoding the bitstream into frequency domain coefficients;
filling in a plurality of blocks with the frequency domain coefficients, wherein at least three different spatial regions of each block are filled with a plurality of the frequency domain components, wherein the at least three spatial regions include a first spatial region being along an entire diagonal of the block from one corner of the block to another corner of the block, second and third spatial regions being on opposite sides of the first region such that the three regions cover the entire block, the regions filled separately; and
performing an inverse transform on the frequency domain.

30. The method of claim 29, wherein each region is filled in according to a scan pattern.

31. The method of claim 30, wherein the scan pattern is a zig-zag pattern.

32. Apparatus for decoding a bitstream, the apparatus comprising a processor for decoding the bitstream into frequency domain coefficients; and filling in a plurality of blocks with the frequency domain coefficients, wherein at least three different spatial regions of each block are filled with a plurality of the frequency domain coefficients, wherein the at least three spatial regions include a first spatial region being along an entire diagonal of the block, second and third spatial regions being on opposite sides of the first regions such that the first, second and third regions cover the entire block, the regions filled separately.

33. The apparatus of claim 32, wherein each region is filled according to a scan pattern.

34. The apparatus of claim 32, wherein the scan pattern is a zig-zag pattern.

35. An article for a processor, the article comprising computer memory encoded with a program for instructing the processor to decode a bitstream into frequency domain coefficients, and separately fill in a plurality of blocks with the frequency domain coefficients, wherein at least three different regions of each block are filled with a plurality of the frequency domain coefficients, wherein the at least three spatial regions include a first spatial region being along an entire diagonal of the block, second and third spatial regions being on opposite sides of the first region such that the first, second and third regions cover the entire block.

36. The article of claim 35, wherein each region is filled in according to a scan pattern.

37. The article of claim 36, wherein the scan pattern is a zig-zag pattern.

* * * * *

UNITED STATES PATENT AND TRADEMARK OFFICE
CERTIFICATE OF CORRECTION

PATENT NO. : 7,190,840 B2　　　　　　　　　　　　　　　　　　　　　　　　Page 1 of 1
APPLICATION NO. : 10/041218
DATED : March 13, 2007
INVENTOR(S) : Amir Said It is certified that error appears in the above-identified patent and that said Letters Patent is hereby corrected as shown below:

In column 3, line 25, after "a codebook" delete "co" and insert -- $c_o$ --, therefor.

In column 4, line 61, in Claim 10, after "performing" insert -- separate --.

In column 4, line 64, in Claim 10, delete "separtae" and insert -- separate --, therefor.

In column 6, line 18, in Claim 29, delete "components" and insert -- coefficients --, therefor.

In column 6, line 41, in Claim 32, after "first" delete "regions" and insert -- region --, therefor.

Signed and Sealed this

Third Day of February, 2009

JOHN DOLL
*Acting Director of the United States Patent and Trademark Office*